US011174602B2

(12) United States Patent
Grimm

(10) Patent No.: US 11,174,602 B2
(45) Date of Patent: Nov. 16, 2021

(54) BROOM ATTACHMENT FOR VEHICLE

(71) Applicant: Blake Grimm Manufacturing, Inc., Indianola, IA (US)

(72) Inventor: Timothy Glenn Grimm, West Des Moines, IA (US)

(73) Assignee: Blake Grimm Manufacturing, Inc., Indianola, IA (US)

(*) Notice: Subject to any disclaimer, the term of this patent is extended or adjusted under 35 U.S.C. 154(b) by 56 days.

(21) Appl. No.: 16/892,477

(22) Filed: Jun. 4, 2020

(65) Prior Publication Data
US 2020/0385939 A1 Dec. 10, 2020

Related U.S. Application Data

(60) Provisional application No. 62/857,443, filed on Jun. 5, 2019.

(51) Int. Cl.
*E01C 23/00* (2006.01)
*E01C 23/06* (2006.01)

(52) U.S. Cl.
CPC .................................. *E01C 23/06* (2013.01)

(58) Field of Classification Search
CPC ....................................................... E01C 23/06
USPC .................................................. 404/83, 113
See application file for complete search history.

(56) References Cited

U.S. PATENT DOCUMENTS

| 2,503,560 | A | * | 4/1950 | Moyer | ..................... | B29C 66/81 |
| | | | | | | 156/390 |
| 4,456,399 | A | * | 6/1984 | Conover | ................. | E01C 23/03 |
| | | | | | | 242/557 |
| 4,684,289 | A | * | 8/1987 | Gnesa | ................... | E01C 11/005 |
| | | | | | | 404/75 |
| 5,018,587 | A | | 5/1991 | Gandrud et al. | | |
| 5,699,863 | A | | 12/1997 | Figura | | |
| 6,962,012 | B1 | | 11/2005 | Grimmett et al. | | |
| 9,371,617 | B2 | | 6/2016 | Thunstrom et al. | | |

(Continued)

OTHER PUBLICATIONS

Rahn Industries, "Infield Groomer Model GL650", 2004, 1 page, https://www.rahngroomer.com/toro.html.

(Continued)

*Primary Examiner* — Raymond W Addie
(74) *Attorney, Agent, or Firm* — Goodhue, Coleman & Owens, P.C.

(57) ABSTRACT

An apparatus for grooming a sports field is provided. The apparatus includes a broom assembly. The broom assembly may include a broom head having a top surface and an opposite bottom surface, a plurality of bristles extending outwardly from the bottom surface of the broom head, a plate secured to the top surface of the broom head and extending longitudinally along the top surface of the broom head, and a stiffener secured to the plate and extending longitudinally along the top surface of the broom head. The apparatus may further include a first connection assembly extending forwardly from the plate and a second connection assembly parallel with and spaced apart from the first arm and extending forwardly from the plate. The broom assembly may have an operative position wherein bristles of the broom assembly engage the ground and a stowed position wherein the broom assembly is positioned above the ground and locked in place such that the broom assembly does not engage the ground.

15 Claims, 5 Drawing Sheets

(56) References Cited

U.S. PATENT DOCUMENTS

| | | | |
|---|---|---|---|
| 10,946,410 B2* | 3/2021 | Wadkins | ............... B05C 19/008 |
| 2005/0194156 A1 | 9/2005 | Job | |
| 2011/0067375 A1* | 3/2011 | Madaffer | ................. A01D 7/04 |
| | | | 56/400.16 |
| 2020/0370250 A1* | 11/2020 | Schlessel | ................ E01C 19/43 |

OTHER PUBLICATIONS

Smithco Buker Rake Implements and Accessories, Mar. 17, 2019, 2 pages, https://www.smithco.com/our-products/golf-course-maintenance/bunker-rakes/bunker-rake-implements-accessories/.

* cited by examiner

BROOM ATTACHMENT FOR VEHICLE

RELATED APPLICATIONS

This application claims priority to U.S. Provisional Patent Application No. 62/857,443, filed Jun. 5, 2019, hereby incorporated by reference in its entirety.

FIELD OF THE INVENTION

The present invention relates to maintenance of sports fields. More particularly, but not exclusively, the present invention relates to a broom attachment for maintenance of sports fields such as, but not limited to, infield areas of baseball or softball fields.

BACKGROUND

Proper care and maintenance of sports fields is important. For example, in baseball and softball it is important to maintain a smooth and consistent infield surface for a variety of reasons. For example, uneven surfaces can present safety issues for players. In addition, it can result in unpredictable ball roll or result in retaining water. Therefore, what is needed are new and improved methods and systems for maintaining sports fields, especially infield areas of baseball or softball fields.

SUMMARY

Therefore, it is a primary object, feature, or advantage of the present invention to improve over the state of the art.

It is a further object, feature, or advantage of the present invention to provide methods, apparatus, and systems for maintaining sports fields, especially infield areas of baseball or softball fields.

It is a still further object, feature, or advantage of the present invention to provide for smoothing the surface of an infield area with a tool which attaches to a self-propelled vehicle.

Another object, feature, or advantage is to provide an apparatus which is easy to use.

A further object, feature, or advantage is to provide an apparatus which is may alternatively be connected directly to a self-propelled vehicle or to a field finisher which is connected to the self-propelled vehicle.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

According to one aspect, an assembly for grooming a sports field is provided. An assembly for grooming a sports field includes a field finisher for being dragged behind a self-propelled vehicle and a broom assembly operatively connected at a rearward portion of the field finisher. The broom assembly has an operative position wherein bristles of the broom assembly engage the ground and the field finisher does not engage the ground. The broom assembly has a stowed position wherein the broom assembly is rotated above the field finisher such that the broom assembly does not engage the ground.

According to another aspect, a system for grooming a sports field includes a broom assembly configured for operatively connecting alternatively to either of a two point frame of a self-propelled vehicle or a field finisher attached to the two point frame of the self-propelled vehicle.

According to another aspect, an apparatus for grooming a sports field is provided. The apparatus includes a broom assembly. The broom assembly may include a broom head having a top surface and an opposite bottom surface, a plurality of bristles extending outwardly from the bottom surface of the broom head, a plate secured to the top surface of the broom head and extending longitudinally along the top surface of the broom head, and a stiffener secured to the plate and extending longitudinally along the top surface of the broom head. The apparatus may further include a first connection assembly extending forwardly from the plate and a second connection assembly parallel with and spaced apart from the first arm and extending forwardly from the plate. The broom assembly may have an operative position wherein bristles of the broom assembly engage the ground and a stowed position wherein the broom assembly is positioned above the ground and locked in place such that the broom assembly does not engage the ground. The first connection assembly and the second connection assembly are configured to interchangeably connect the apparatus to one of a two-point hitch of a self-propelled vehicle and a field finisher pulled behind the self-propelled vehicle. Each of the first connection assembly and the second connection assembly may include a pin member having a first end at the plate and an opposite second end and have an aperture extending therethrough which is positioned proximate the opposite second end. The first connection assembly may include a first arm assembly and the second connection assembly may include a second arm assembly. Each of the first arm assembly and the second arm assembly may include a first hinge support member and a second hinge support member, each of the first hinge support member and the second hinge support member having a first aperture and a second aperture. Each of the first and second arm assembly may further include an arm extending outwardly from the first hinge support member and the second hinge support member, the arm having an aperture therethrough, the aperture of the arm aligned with the first aperture of the first hinge support member and the first aperture of the second hinge support member. Each of the first arm assembly and the second arm assembly may further include a bolt extending through the aperture of the arm, the first aperture of the first hinge support member and the first aperture of the second hinge support member and a clamp having a first clamp member and a second clamp member, the clamp operatively connected to the first hinge support member and the second hinge support member, each of the first clamp member and the second clamp member having an aperture therein with the aperture of the first clamp member and the aperture of the second clamp aligned for positioning a bolt therethrough. Each of the first and the second arm assembly may further include a pin extending through the second aperture of the first hinge support member and the second aperture of the second hinge support member, the pin having a wire lock.

According to another aspect, an apparatus for grooming a sports field includes a field finisher configured to be dragged behind a self-propelled vehicle and a broom assembly operatively connected at a rearward portion of the field finisher. The broom assembly has an operative position wherein bristles of the broom assembly engage the ground and the field finisher does not engage the ground. The broom assembly has a stowed position wherein the broom assembly is positioned above the field finisher and locked in place such that the broom assembly does not engage the ground and the field finisher engages the ground. The broom assembly may further include a broom head having a top surface and an opposite bottom surface, a plurality of bristles extending outwardly from the bottom surface of the broom head, a plate secured to the top surface of the broom head and extending longitudinally along the top surface of the broom head, and a stiffener secured to the plate and extending longitudinally along the top surface of the broom head. The broom assembly may be operatively connected to the field finisher using a first arm assembly and a second arm assembly. Each of the first arm assembly and the second arm assembly may include a first and a second opposed hinge support members, each having first and second surfaces and each of the first and the second opposed hinge support members having a first aperture and a second aperture, an arm extending outwardly from the cam, the arm having an opening therethrough, the opening of the arm aligned with the first aperture of the first hinge support member and the first aperture of the second hinge support member, a bolt extending through the opening of the arm, the first aperture of the first hinge support member and the first aperture of the second hinge support member, and a clamp having a first clamp member and a second clamp member, the clamp operatively connected to the first hinge support member and the second hinge support member, each of the first clamp member and the second clamp member having an aperture therein with the aperture of the first clamp member and the aperture of the second clamp aligned for positioning a bolt therethrough; and a pin extending through the aperture hole of the first hinge support member and the second aperture of the second hinge support member, the pin having a wire lock.

According to another aspect, an apparatus for grooming a sports field, may include a broom assembly for operative connection to at least one of a two point frame of a self-propelled vehicle and a rearward portion of a field finisher attached to the two point frame of the self-propelled vehicle. The broom assembly has an operative position wherein bristles of the broom assembly engage the ground and a stowed position wherein the broom assembly locked in place such that the broom assembly does not engage the ground. The broom assembly includes a first arm assembly and a second arm assembly for connecting the broom assembly to one of the two point frame of the self-propelled vehicle and the rearward portion of the field finisher attached to the two point frame of the self-propelled vehicle. Each of the first arm assembly and the second arm assembly include a first hinge support member and a second hinge support member, each of the first hinge support member and the second hinge support member having a first aperture and a second aperture, an arm extending outwardly from the first hinge support member and the second hinge support member, the arm having an aperture therethrough, the aperture of the arm aligned with the first aperture of the first hinge support member and the first aperture of the second hinge support member, a bolt extending through the aperture of the arm, the first aperture of the first hinge support member and the first aperture of the second hinge support member, a clamp having a first clamp member and a second clamp member, the clamp operatively connected to the first hinge support member and the second hinge support member, each of the first clamp member and the second clamp member having an aperture therein with the aperture of the first clamp member and the aperture of the second clamp aligned for positioning a bolt therethrough, and a pin extending through the second aperture of the first hinge support member and the second aperture of the second hinge support member, the pin having a wire lock.

BRIEF DESCRIPTION OF THE DRAWINGS

Illustrated embodiments of the disclosure are described in detail below with reference to the attached drawing figures, which are incorporated by reference herein.

DETAILED DESCRIPTION

Various equipment is available for grooming sports fields. For example, John Deere makes various bunker and field rakes such as its models 1200A, 1200H HYDRO which are self-propelled vehicles which may be outfitted with a front blade and may include a rear mounted rake. In addition to these machines, other types of machines may be used such as JOHN DEERE GATOR models. Of course, other types of lawn tractors, all-terrain utility vehicles, or other types of utility vehicles from any number of manufacturers may be used including those from companies such as Toro, Jacobsen, Cushman, or others.

Figure 1:
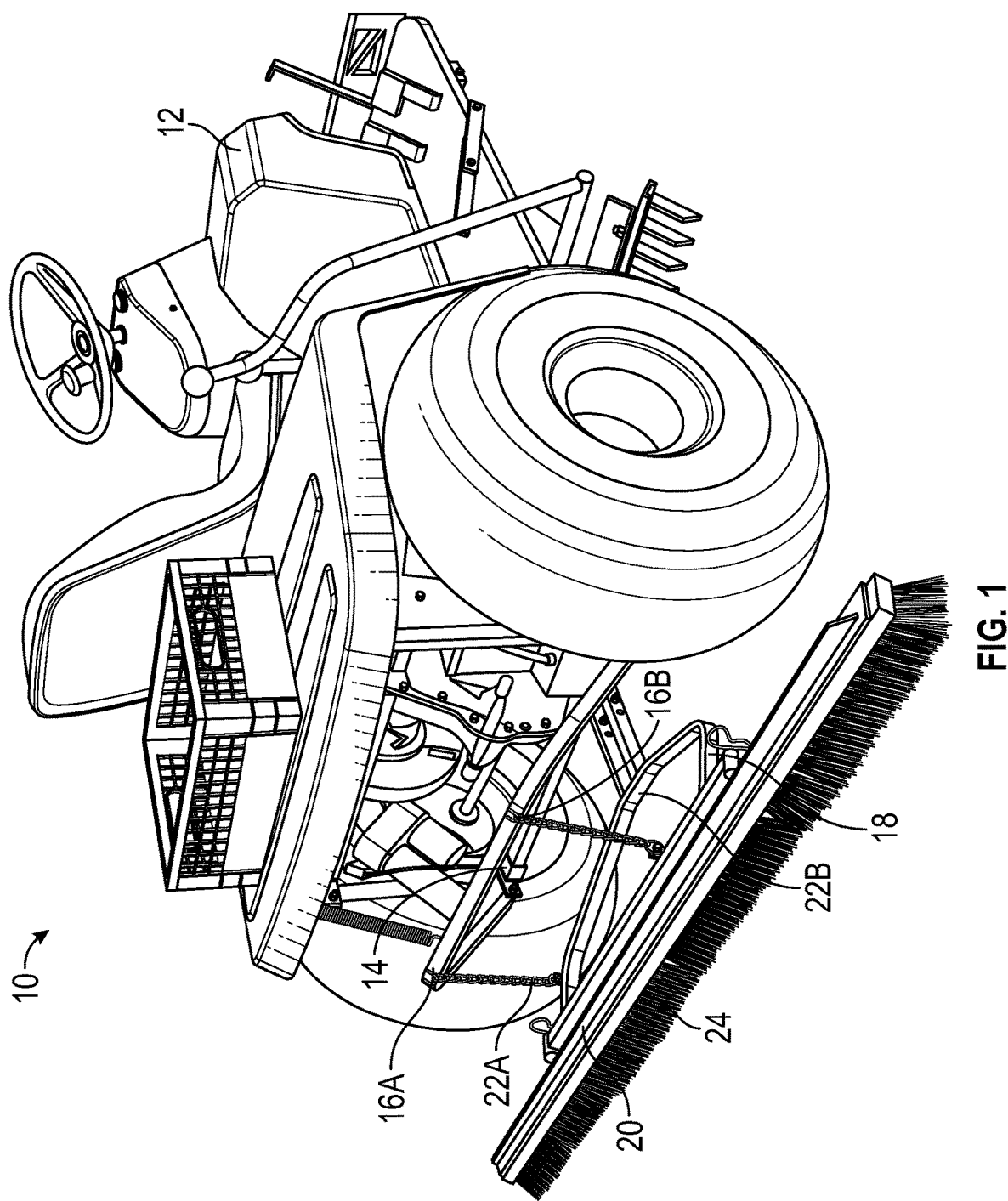
FIG. 1 illustrates a self-propelled vehicle with a broom assembly in an operative position.

FIG. 1 illustrates one example of a system 10. The system 10 includes a self-propelled utility vehicle 12 which may be a JOHN DEERE 1200A or other type of self-propelled utility vehicle. At a rearward end of the vehicle 12, lift tube 14 is shown with lift hooks 16A, 16B which are used to secure chains 22A, 22B. The opposite ends of the chains 22A, 22B are secured to a two point frame 18 using two pins with clips or other connection assemblies. The two point frame 18 can be lifted and lowered through control by an electro-mechanical actuator. A broom assembly 20 is operatively connected to the frame 18. Thus, in operation and once adjusted to a proper height such as may be achieved by adjusting chain length as necessary, the broom assembly 20 may be positioned such that bristles 24 engage the ground surface. As the bristles are dragged across the ground surface, the ground surface is groomed resulting in a smoother, more consistent surface.

Figure 2:
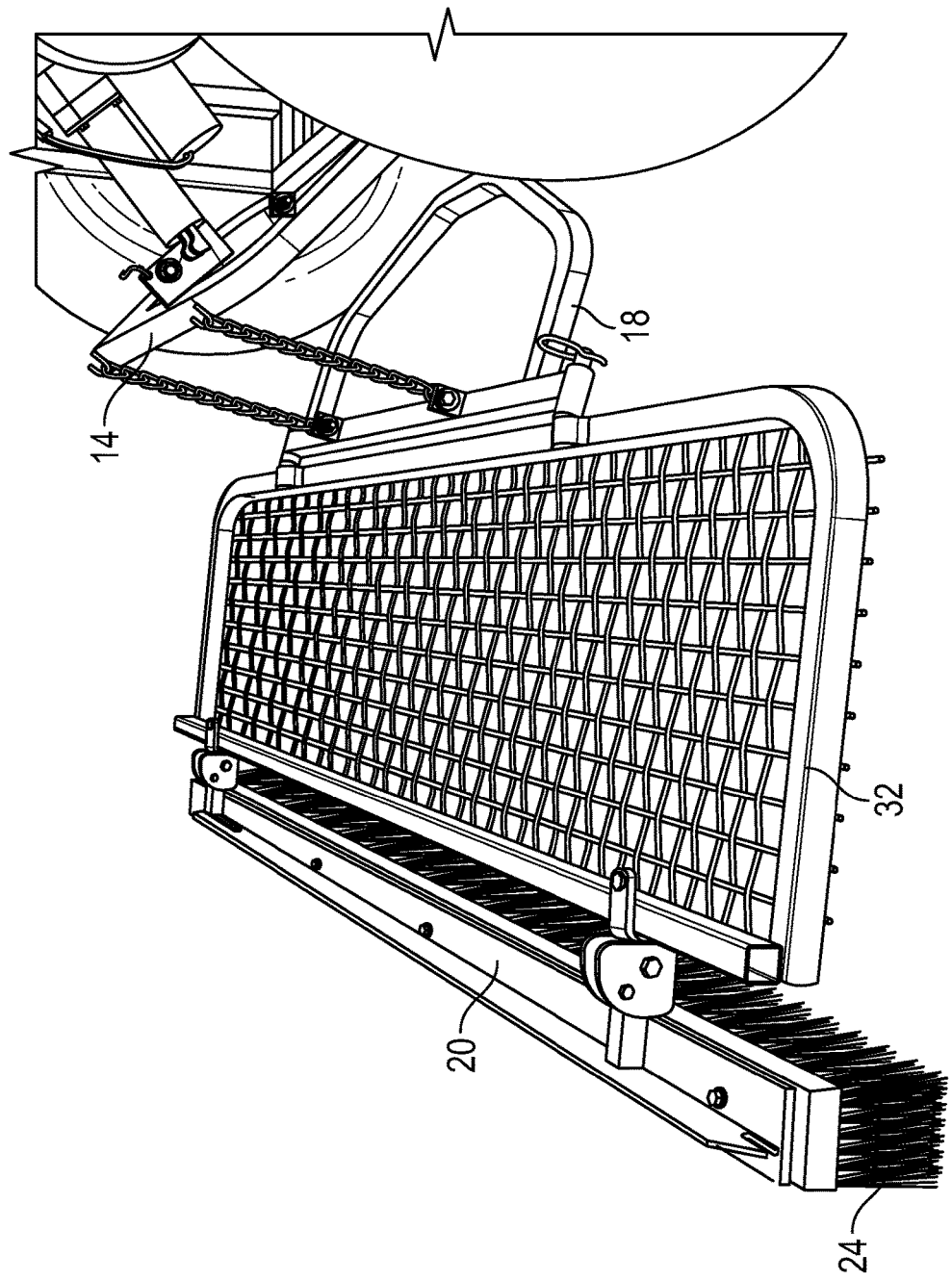
FIG. 2 illustrates a self-propelled vehicle with a field finisher or rake attachment and a broom assembly attached to the field finisher or rake.

FIG. 2 illustrates another embodiment of a system. As shown in FIG. 2, a frame 18 is secured with chains 22A, 22B similar to that shown in FIG. 1. In FIG. 2, a rake or field finisher 32 is operatively connected to the frame 18. In operation, the field finisher 32 may be dragged across the ground surface in the conventional manner. At the rearward end of the field finisher 32 is a broom assembly 20. The broom assembly 20 may be moved between an operative position such as that shown where bristles 24 engage the ground surface. Alternatively, the broom assembly 20 may be moved to a stowed position where the broom is pivoted upward such that the bristles of the broom assembly 20 are no longer in contact with the ground. If desired, the field finisher 32 may be lowered such that the field finisher may be in ground engaging contact with the ground.

Figure 3:
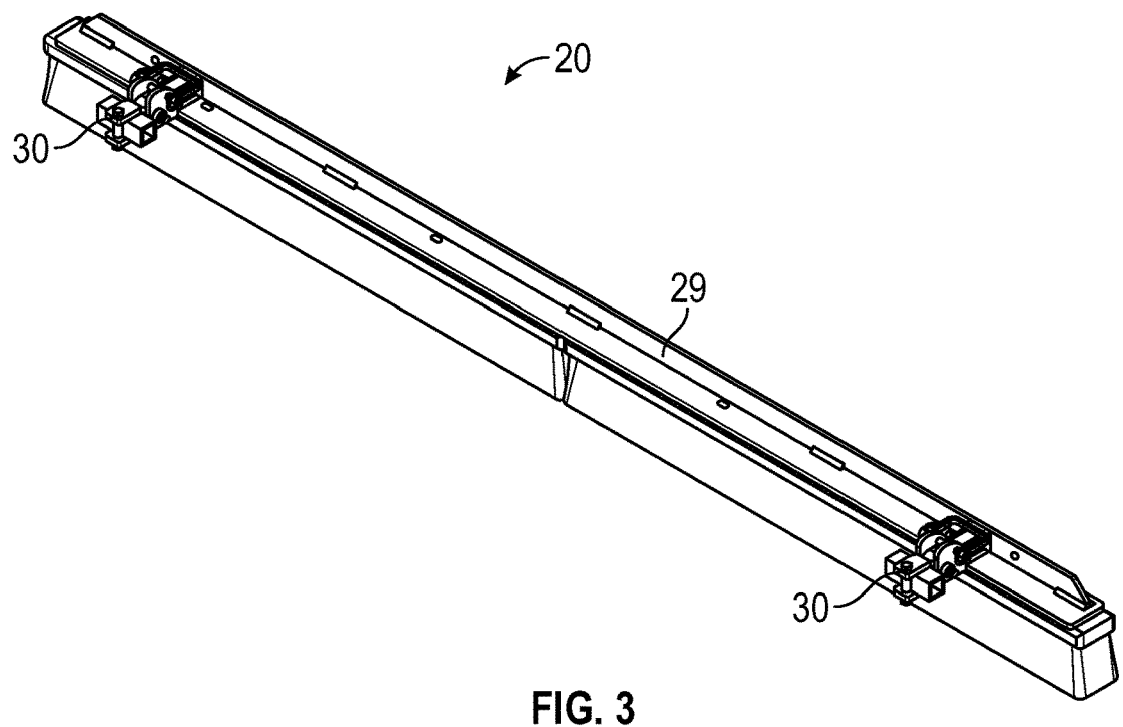
FIG. 3 is a perspective view of a broom assembly.

FIG. 3 is a perspective view of the broom assembly 20. The broom assembly 20 has a broom head with a top surface and an opposite bottom surface. A plurality of bristles extend outwardly from the bottom surface of the broom head. A plate is secured to the top surface of the broom head, the plate extends longitudinally along the top surface of the broom head. A stiffener 29 may extend across a surface of the broom assembly 20 to provide additional support. The broom assembly is operatively connected to the field finisher or to a two-point hitch of a self-propelled vehicle with connection assemblies in the form of first and second arm assemblies 30. The arm assemblies allow the broom assembly 20 to be secured to the rake or field finisher or alternatively to the two-point hitch of the self-propelled vehicle.

Figure 4:
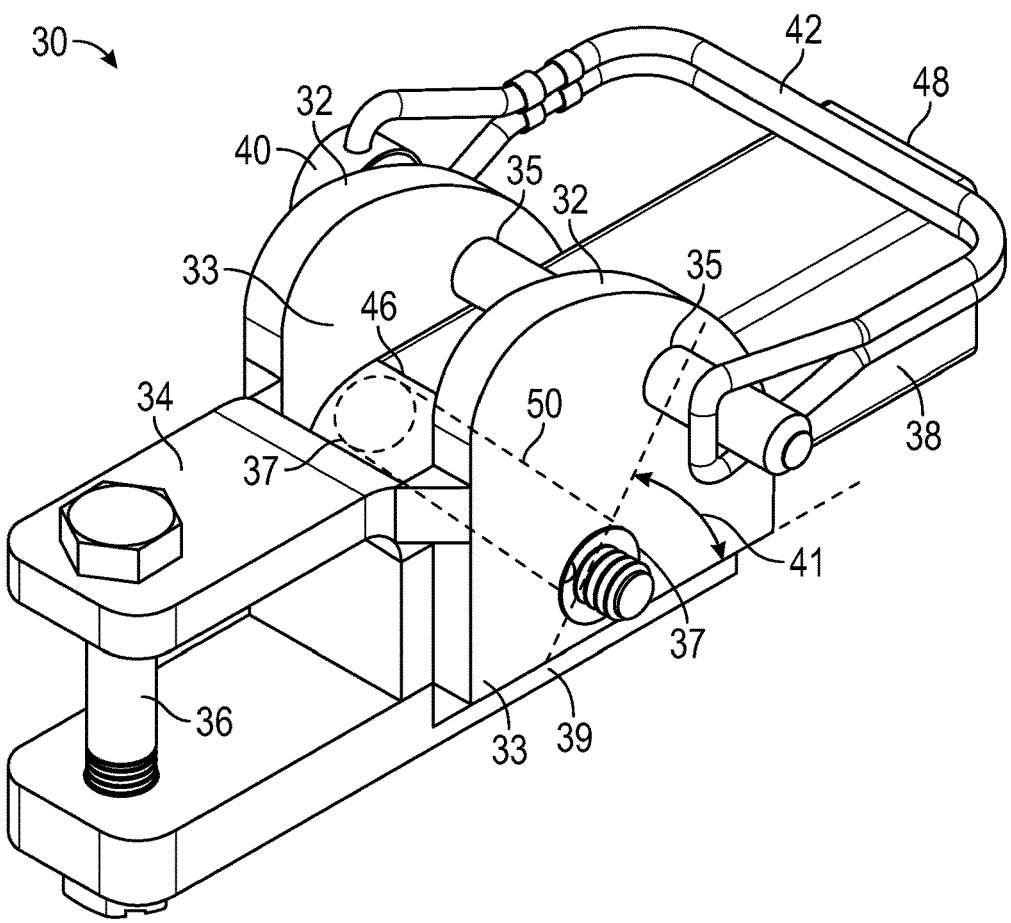
FIG. 4 is a perspective view of an arm assembly for the broom assembly.

FIG. 4 is a perspective view of an arm assembly 30. The arm assembly 30 includes first and second opposite hinge support members 33 having first and second surfaces 32 disposed opposite first and second bottom surfaces 39. The first and second hinge support members 33 are configured within the arm assembly 30 parallel to each other and separated by hinged arm 38. Each hinge support member 33 includes first apertures 35 and second apertures 37. First apertures 35 are disposed proximate first and second surfaces 32. In one aspect, first apertures 35 can be disposed at an angle 41 of 25-75 degrees from first and second bottom surfaces 39. In another aspect, first apertures 35 are disposed at an angle 41 of 45 degrees from first and second bottom surfaces 39. Second apertures 37 are disposed proximate first and second bottom surfaces. A pin 40, extends through first and second apertures 35. Pin 40 is removably attachable to first and second hinges support members 33 using a wire lock 42. The wire lock 42 can be pivotally and removably coupled to ends of pin 40. A portion of pin 40 is disposed between first and second hinge support members 33 when coupled to the arm assembly 30. A bolt 44 extends through second apertures 37 of each hinge support member 33. Hinged arm 38 includes a first end 46 and a second opposite end 48. An aperture 50 extends through first end 46 of hinged arm 38. Bolt 44 removably couples hinged arm 38 to arm assembly 30 by extending through aperture 50 and second apertures 37. Hinged arm 38 rotates freely between generally horizontal and vertical positions with pin 40 removed. Hinged arm 38 can be locked in a generally horizontal position with pin 40. Hinged arm 38 is generally parallel with first and second bottom surfaces 39 in the horizontal position. Hinged arm 38 can also be locked in a position above pin 40. For example, hinged arm 38 can be locked in a 45-degree position when pin 40 extends through first apertures 35 disposed at a 45 degree angle 41 from first and second bottom surfaces 39. The angle 41 of hinged arm 38 relative to first and second bottom surfaces 39 can be changed by changing the angle of first apertures 35. For example, first apertures 35 can be disposed anywhere along first and second surfaces 32 for controlling the angle of hinged arm 38 when locked below and above pin 40. Arm assembly also includes a mounting bracket 34 attached to first and second hinge support members to secure the arm assembly to the rake (not shown). For example, a bolt 36 may extend through apertures in both ends of the clamp to removably secure the arm assembly 30 to the rake (not shown).

Figure 5:
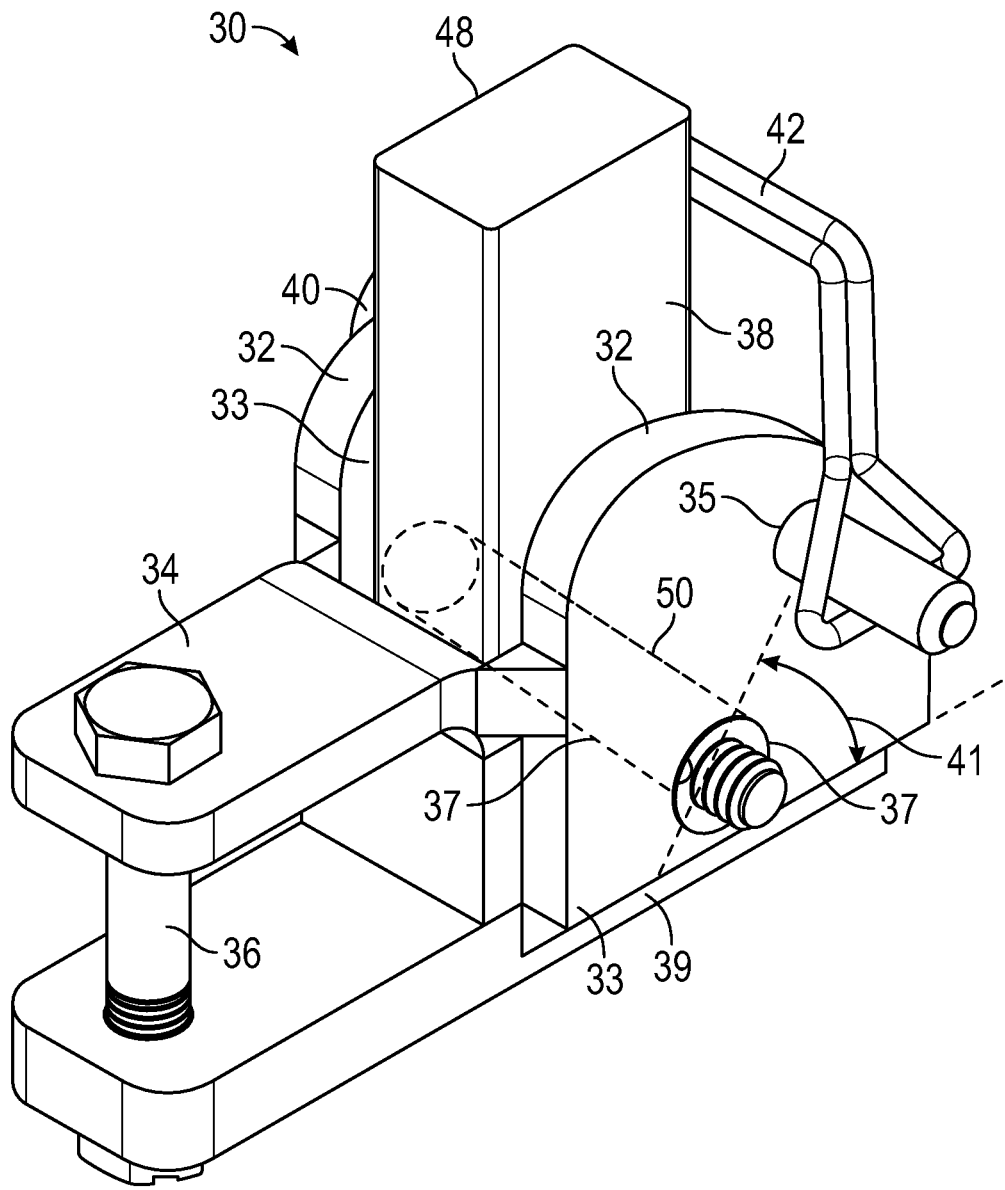
FIG. 5 is a perspective view of the arm assembly as in FIG. 4 except showing the arm assembly when the broom assembly would be in a stowed position.

FIG. 5 is a perspective view of the arm assembly 30 except showing the arm assembly 30 when the broom attachment would be in a stowed position. Thus, relative to FIG. 4, the pin 40 has been removed, the arm 38 has been rotated upwardly and then the pin 40 has been replaced to lock the arm 38 into the stowed position. Thus, it should be apparent that the broom attachment may be easily and conveniently moved from an operative position to a stowed position. This is particularly advantageous when the broom attachment is secured to the rake or field finisher because it allows the rake or field finisher to be used in the customary way while the broom attachment is present and in a stowed position.

Figure 6:
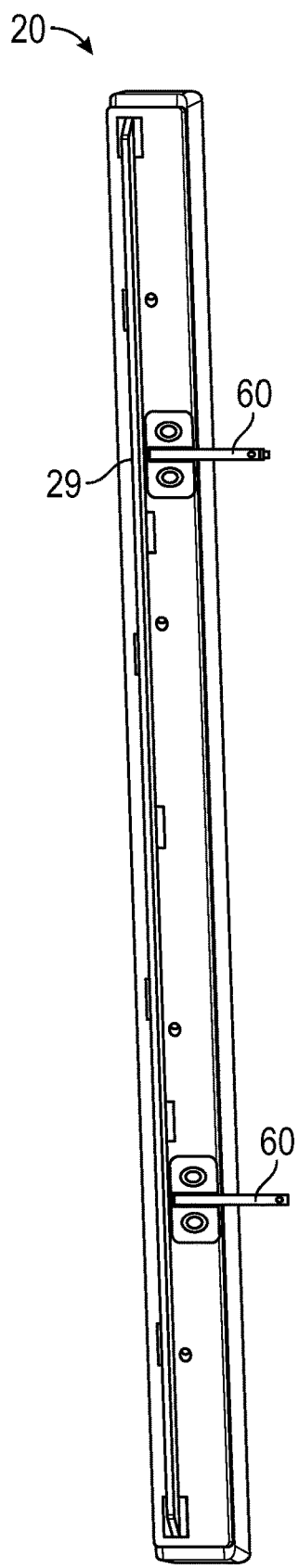
FIG. 6 illustrates another view of the broom assembly as shown in FIG. 1.
Figure 7:
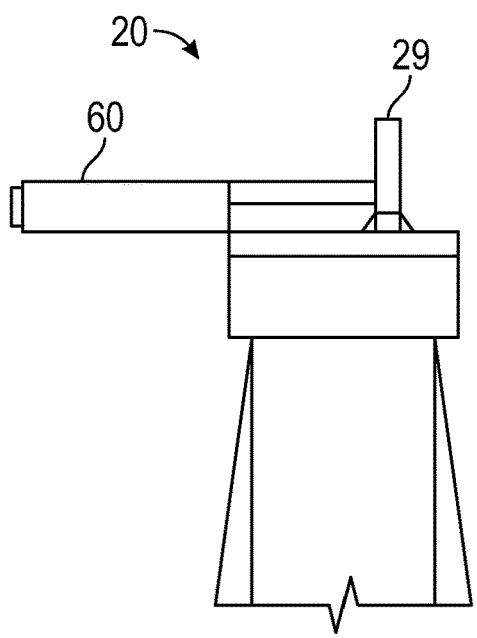
FIG. 7 further illustrates the broom assembly of FIG. 6

FIG. 6 and FIG. 7 illustrate the broom attachment 20 with the stiffener 29 present. Here, a first and a second connection assemblies include pin member 60 which are welded to, bolted to, or otherwise secured to the broom attachment. The pin members 60 may be used to secure the broom attachment 20 to at least one of a two point frame of a self-propelled vehicle or a rearward portion of a field finisher attached to the two point frame of the self-propelled vehicle. For example, the pin members 60 may be inserted into apertures in the two point frame or the field finisher and then a retaining clip (not shown) may secure the pin members 60 to the self-propelled vehicle. Thus, the pin members 60 function as a first arm and a second arm. It is contemplated that the two point frame or the field finisher may have apertures aligned on top and on bottom as well as apertures aligned at front and back. With such a configuration, the pin members 60 may be inserted through the top and bottom apertures and secured in place with the retaining clip to put the broom attachment 20 in a stowed position. Similarly, the pin members 60 may be inserted through the back and front apertures and secured in place with the retaining clip to put the broom attachment 20 in an operative position so that bristles of the broom may engage the ground surface.

Although specific structure is shown and described for various embodiments, other embodiments are contemplated that allow for easy to use operation and which allow for quick configuration. For example, other embodiments are contemplated which allow for transitioning between an operative position for the broom and an operative position for a rake. Such embodiments may rely on pivoting or rotation of the broom between different positions, quick connect or quick disconnect of the broom, or other means of transition.

The invention is not to be limited to the particular embodiments described herein. In particular, the invention contemplates numerous variations in the size of the broom, the types of bristles used, the type of self-propelled vehicle used, the manner in which the broom is mounted, and other variations. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes or methods of the invention. It is understood that any other modifications, substitutions, and/or additions can be made, which are within the intended spirit and scope of the invention.

What is claimed is:

1. An apparatus for grooming a sports field, the apparatus comprising:
  a broom assembly, the broom assembly comprising:
    (a) a broom head having a top surface and an opposite bottom surface;
    (b) a plurality of bristles extending outwardly from the bottom surface of the broom head;

(c) a plate secured to the top surface of the broom head and extending longitudinally along the top surface of the broom head; and (d) a stiffener secured to the plate and extending longitudinally along the top surface of the broom head;

a first connection assembly extending forwardly from the plate;

a second connection assembly parallel with and spaced apart from the first connection assembly and extending forwardly from the plate;

the broom assembly having an operative position wherein bristles of the broom assembly engage the ground;

the broom assembly having a stowed position wherein the broom assembly is positioned above the ground and locked in place such that the broom assembly does not engage the ground;

wherein the first connection assembly and the second connection assembly are configured to interchangeably connect the apparatus to one of a two-point hitch of a self-propelled vehicle and a field finisher pulled behind the self-propelled vehicle.

2. The apparatus of claim 1 wherein each of the first connection assembly and the second connection assembly comprises a pin member having a first end at the plate and an opposite second end and having aperture extending through proximate the opposite second end.

3. The apparatus of claim 1 wherein the first connection assembly comprises a first arm assembly and the second connection assembly comprises a second arm assembly and each of the first arm assembly and the second arm assembly comprise:

a first hinge support member and a second hinge support member, each of the first hinge support member and the second hinge support member having a first aperture and a second aperture;

an arm extending outwardly from the first hinge support member and the second hinge support member, the arm having an aperture therethrough, the aperture of the arm aligned with the first aperture of the first hinge support member and the first aperture of the second hinge support member;

a bolt extending through the aperture of the arm, the first aperture of the first hinge support member and the first aperture of the second hinge support member;

a clamp having a first clamp member and a second clamp member, the clamp operatively connected to the first hinge support member and the second hinge support member, each of the first clamp member and the second clamp member having an aperture therein with the aperture of the first clamp member and the aperture of the second clamp aligned for positioning a bolt therethrough; and a pin extending through the second aperture of the first hinge support member and the second aperture of the second hinge support member, the pin having a wire lock.

4. An apparatus for grooming a sports field, the apparatus comprising:

a field finisher configured to be dragged behind a self-propelled vehicle;

a broom assembly operatively connected at a rearward portion of the field finisher;

the broom assembly having an operative position wherein bristles of the broom assembly engage the ground and the field finisher does not engage the ground;

the broom assembly having a stowed position wherein the broom assembly is positioned above the field finisher and locked in place such that the broom assembly does not engage the ground and the field finisher engages the ground.

5. The apparatus of claim 4 wherein the broom assembly further comprises:

(a) a broom head having a top surface and an opposite bottom surface;

(b) a plurality of bristles extending outwardly from the bottom surface of the broom head;

(c) a plate secured to the top surface of the broom head and extending longitudinally along the top surface of the broom head; and (d) a stiffener secured to the plate and extending longitudinally along the top surface of the broom head.

6. The apparatus of claim 5 wherein the broom assembly is operatively connected to the field finisher using a first arm assembly and a second arm assembly.

7. The apparatus of claim 6 wherein each of the first arm assembly and the second arm assembly comprises:

a first and a second opposed hinge support members, each having first and second surfaces and each of the first and the second opposed hinge support members having a first aperture and a second aperture;

an arm extending outwardly from the cam, the arm having an opening therethrough, the opening of the arm aligned with the first aperture of the first hinge support member and the first aperture of the second hinge support member;

a bolt extending through the opening of the arm, the first aperture of the first hinge support member and the first aperture of the second hinge support member;

a clamp having a first clamp member and a second clamp member, the clamp operatively connected to the first hinge support member and the second hinge support member, each of the first clamp member and the second clamp member having an aperture therein with the aperture of the first clamp member and the aperture of the second clamp aligned for positioning a bolt therethrough; and a pin extending through the aperture hole of the first hinge support member and the second aperture of the second hinge support member, the pin having a wire lock.

8. The apparatus of claim 5 wherein the broom assembly further comprises a broom attachment secured to a broom head.

9. The apparatus of claim 8 wherein the broom assembly further comprises a stiffener extending longitudinally along the broom attachment.

10. The apparatus of claim 5 wherein the broom assembly is operatively connected to the field finisher using a first arm and a second arm.

11. The apparatus of claim 10 wherein the broom assembly further comprises a broom attachment secured to a broom head.

12. The apparatus of claim 11 wherein the broom assembly further comprises a stiffener extending longitudinally along the broom attachment.

13. An apparatus for grooming a sports field, the apparatus comprising:

a broom assembly for operative connection to at least one of a two point frame of a self-propelled vehicle and a rearward portion of a field finisher attached to the two point frame of the self-propelled vehicle;

the broom assembly having an operative position wherein bristles of the broom assembly engage the ground;

the broom assembly having a stowed position wherein the broom assembly locked in place such that the broom assembly does not engage the ground;

a first arm assembly and a second arm assembly for connecting the broom assembly to one of the two point frame of the self-propelled vehicle and the rearward portion of the field finisher attached to the two point frame of the self-propelled vehicle;

each of the first arm assembly and the second arm assembly comprising:
- a first hinge support member and a second hinge support member, each of the first hinge support member and the second hinge support member having a first aperture and a second aperture;
- an arm extending outwardly from the first hinge support member and the second hinge support member, the arm having an aperture therethrough, the aperture of the arm aligned with the first aperture of the first hinge support member and the first aperture of the second hinge support member;
- a bolt extending through the aperture of the arm, the first aperture of the first hinge support member and the first aperture of the second hinge support member;
- a clamp having a first clamp member and a second clamp member, the clamp operatively connected to the first hinge support member and the second hinge support member, each of the first clamp member and the second clamp member having an aperture therein with the aperture of the first clamp member and the aperture of the second clamp aligned for positioning a bolt therethrough; and
- a pin extending through the second aperture of the first hinge support member and the second aperture of the second hinge support member, the pin having a wire lock.

14. The apparatus of claim 13 wherein the broom assembly further comprises a broom attachment secured to a broom head.

15. The apparatus of claim 14 wherein the broom assembly further comprises a stiffener extending longitudinally along the broom attachment.

* * * * *